US007664962B2

(12) United States Patent
Kuhlman

(10) Patent No.: US 7,664,962 B2
(45) Date of Patent: Feb. 16, 2010

(54) MULTIPLE-INPUT, AUTOMATIC RECOGNITION METHOD AND APPARATUS

(75) Inventor: Douglas Kuhlman, Inverness, IL (US)

(73) Assignee: Motorola, Inc., Schaumburg, IL (US)

( * ) Notice: Subject to any disclaimer, the term of this patent is extended or adjusted under 35 U.S.C. 154(b) by 771 days.

(21) Appl. No.: 11/276,732

(22) Filed: Mar. 13, 2006

(65) Prior Publication Data
US 2007/0210895 A1 Sep. 13, 2007

(51) Int. Cl.
G06K 9/00 (2006.01)
G06F 21/00 (2006.01)
G06Q 30/00 (2006.01)
G06F 11/00 (2006.01)

(52) U.S. Cl. ........................ 713/186; 382/115; 382/116; 340/5.53; 706/15; 726/22

(58) Field of Classification Search ......... 382/115–127; 713/186; 726/22; 706/15
See application file for complete search history.

(56) References Cited
U.S. PATENT DOCUMENTS 6,580,691 B1 6/2003 Bjoerkman et al.
7,565,265 B2 * 7/2009 Kuhlman .................... 702/181
2002/0180586 A1 12/2002 Kitson et al.
2003/0108220 A1 6/2003 Jepson et al.
2005/0071635 A1 * 3/2005 Furuyama .................. 713/168

OTHER PUBLICATIONS

Zhang, Sheng, Rajkumar Janakiraman, Terence Sim, and Sandeep Kumar. "Continuous Verification Using Multimodal Biometrics." Lecture Notes in Computer Science. 3832/2005(2005): 562-570. Print.*
Covington, Michael J., Mustaque Ahamad, Irfan Essa, and H. Venkateswaran. "Parameterized Authentication ." Lecture Notes in Computer Science. 3193/2004(2004): 276-292. Print.*
WIPO, ISA/US, PCT Search Report and Written Opinion from corresponding application, Sep. 23, 2008.

* cited by examiner

Primary Examiner—Michael J Simitoski
Assistant Examiner—Imhotep Durham

(57) ABSTRACT

Automatic recognition apparatus (100, 700) includes multiple automatic recognition subsystems (102, 104, 106) that are cable of producing estimates of the probability that a subject matches a particular identity, a probability estimate combiner (108) that receives estimates from the multiple automatic recognition subsystems (102, 104, 106) and produces a combined estimate, and a decayer that (111) that decreases the certainty of the combined estimate over time while avoiding changing estimates to values that would suggest strong information contrary to the initial values of the combined estimates.

12 Claims, 9 Drawing Sheets

*FIG. 2*
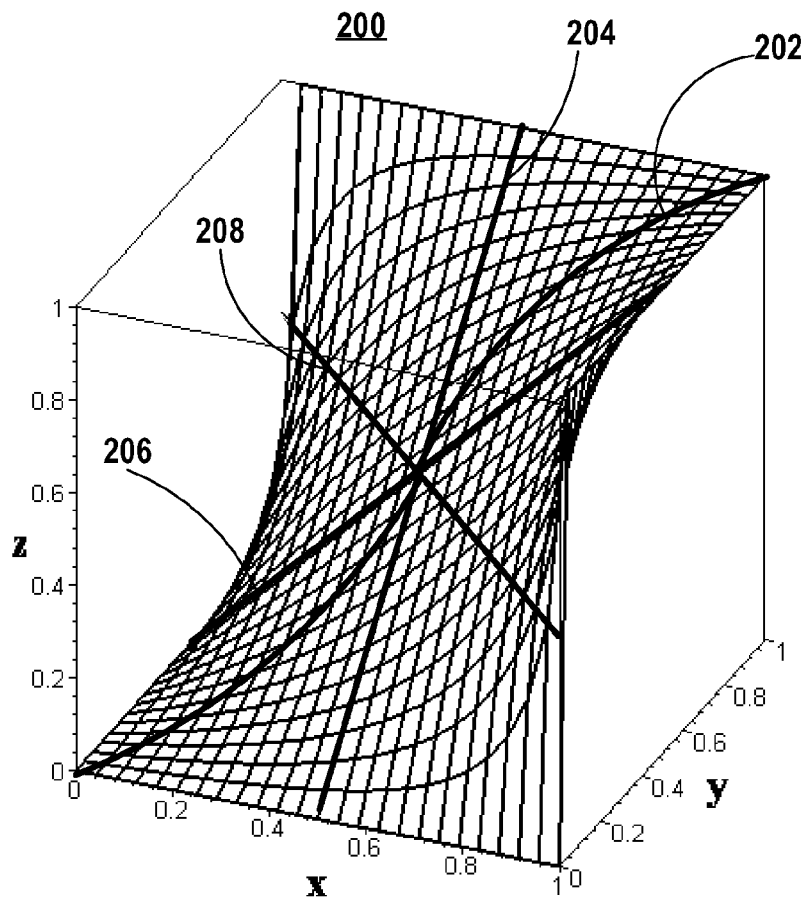
*FIG. 3*  |C(x,x)-0.5|>|x-0.5| for all x<>0.5,0.0,1.0
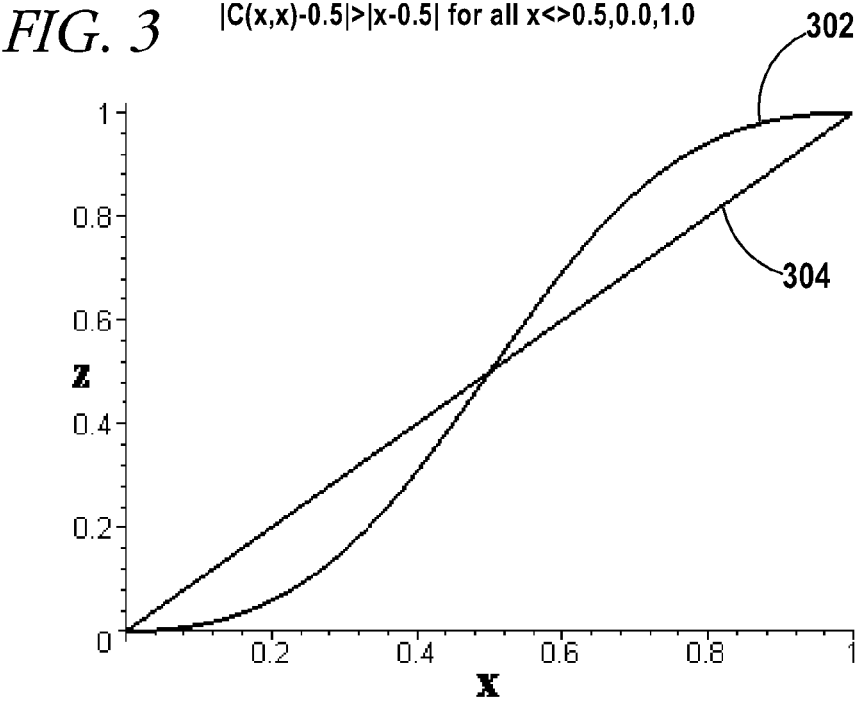

400

FIG. 13             1300
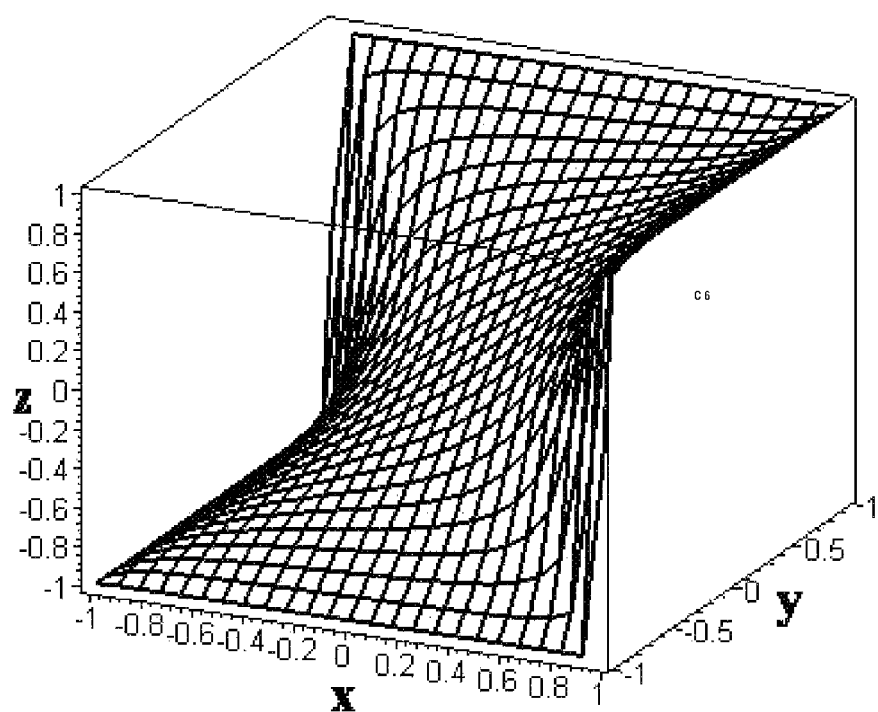

US 7,664,962 B2

MULTIPLE-INPUT, AUTOMATIC RECOGNITION METHOD AND APPARATUS

FIELD OF THE INVENTION

The present invention relates generally to automatic recognition systems such as biometric identification systems.

BACKGROUND

In the information age many information systems (e.g., credit card systems, driver's license management systems) have been developed which rely on assertions of identity by people being offered services through the systems. Moreover, as modern societies have developed, the scope of people's daily interactions has expanded to the point that parties from whom they are requesting services or with whom they are doing business, may not know them and thus may not be able to independently verify their identity. Thus, the problem of identity misrepresentation has developed. An extreme form of identity misrepresentation is identity theft.

The development of the Internet over the past decade has been accompanied by development of e-commerce in which two parties to a transaction are situated at distant locations and transactions are conducted via the Internet. Unfortunately, e-commerce allows for new modalities of business fraud, in particular, because the parties need not ever meet, it is possible for one party to a transaction to misrepresent their identity.

In the area of physical security, electronic systems that rely on technologies such as Radio Frequency Identification (RFID) access cards, and biometric sensors have been developed. As with any security means, these systems are not invulnerable and a sophisticated hacker may be able to undermine them.

Biometric systems take measurements such as images of a person's face, fingerprint, retina, or iris, for example, and process the images using, for example statistical pattern recognition algorithms, in order to estimate one or more probabilities that the person being measured by the biometric system is in fact a particular person or one of a set of people whose data is stored in the biometric system.

Systems in which multiple biometric measurements are combined for the purpose of identity checking have been proposed. One way to combine multiple biometric identity probability estimates, is to use the MIN function or the MAX function however doing so, essentially discards the information represented in one of the measurements. Another way is to take two measurements that are normalized, if necessary, so that they are on the same scale and to average them. One property of averaging is that when it is applied to a high estimate that a person matches an identity, and a moderate estimate that the person matches the identity, rather than producing an even higher estimate that the person matches the identity, averaging will produce an estimate that is between the two estimates. In other words, by the process of averaging, multiple estimates that indicate, to varying degrees, that a person has a particular identity do not reinforce each other to yield an estimate that reflects a greater degree of certainty that the person matches the identity. Yet another way of combining two estimates of the probability that a person matches an identity is to multiply the two estimates.

More generally, beyond recognizing people, pattern recognition techniques can be used to recognize other things, such as spoken words, and handwritten text, for example.

Typically, automatic identity verification systems are separate. For example systems used to control physical access to a facility are separate from systems used to control access to local computer files, and separate from systems used to control access to remote computer resources via the Internet. Thus, persons requiring access to multiple secure facilities, areas and/or resources must use automatic identification systems repeatedly. Doing so is time consuming and can be distracting for busy people. If access to a particular facility, area or resource is conditioned on multiple identity tests, for example based on one or more biometric tests and an electronic key the time required to pass security tests is further increased.

One possible solution to reducing the time spent authenticating identity is to allow a single authentication result to remain valid for a predetermined period of time (e.g., 24 hours) and to be distributed to multiple systems. A problem with doing so, is that different systems require different levels of security. Higher security systems require higher levels of certainty that a person matches an authorized identity, and for high level security the authentication should remain valid for a shorter period of time.

What is needed is an improved system and method for combining multiple estimates of the probability that a person or thing matches an identity.

Furthermore, what is needed is a system that provides sufficient flexibility so that security systems and/or applications that have different level security requirements can share combined estimates that a person or thing matches an identity, thereby removing the need for separate authentications for each security system and/or application.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2 is a surface plot of a function for combining two estimates of the probability that a particular object or person has a particular identity;

FIG. 3 is 2-D section through the surface plot shown in FIG. 2 showing a plane in which the two independent variables (two estimates) are equal;

FIG. 13 is a surface plot of a third function for combining two estimates of the probability that a particular object or person has a particular identity.

Figure 1:
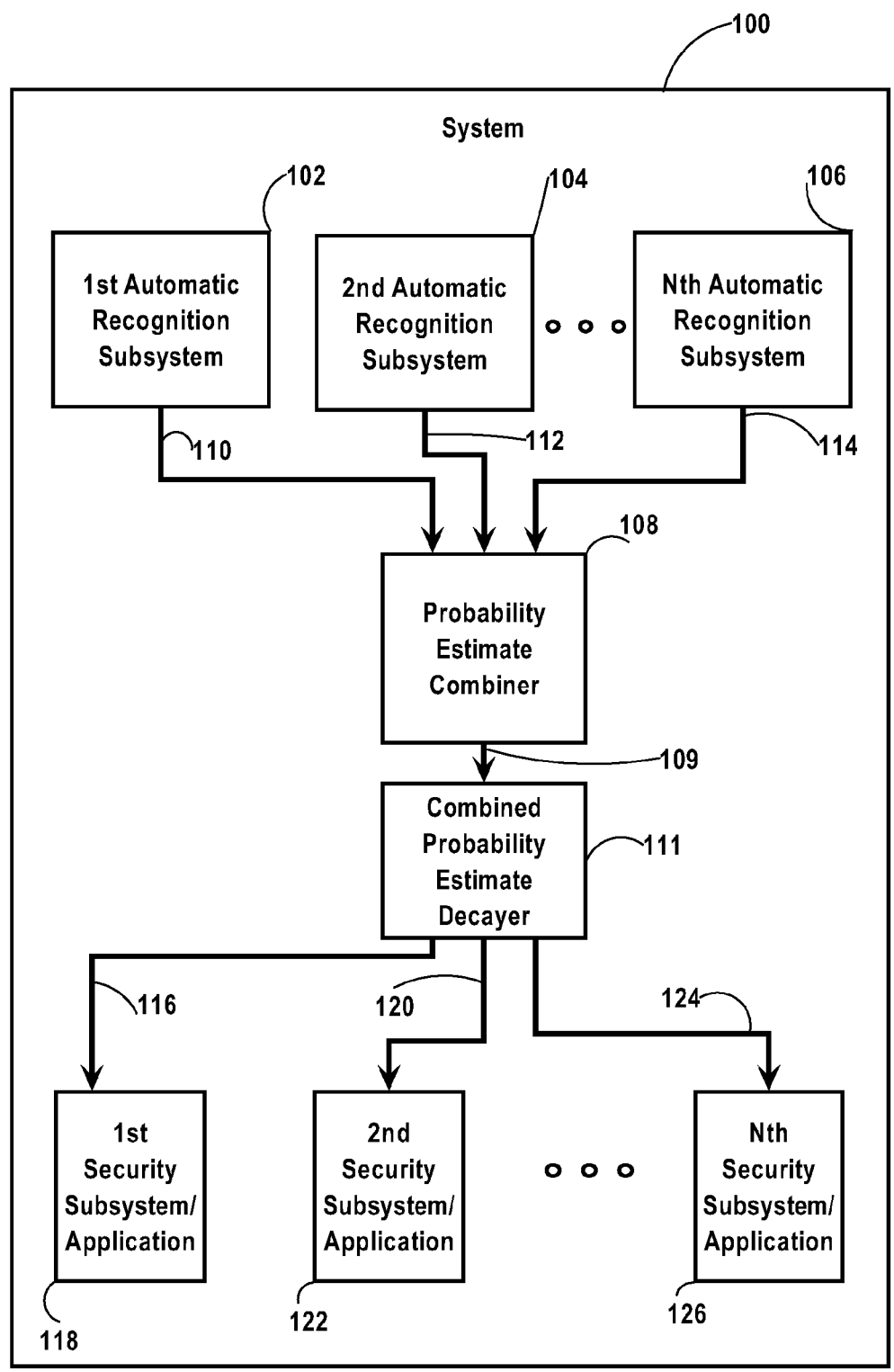
FIG. 1 is functional block diagram of a system for performing automatic recognition, according to certain embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to automatic recognition. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of automatic recognition described herein. The non-processor circuits may include, but are not limited to, a radio receiver, a radio transmitter, signal drivers, clock circuits, power source circuits, and user input devices. As such, these functions may be interpreted as steps of a method to perform automatic recognition. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is functional block diagram of system 100 for performing automatic recognition, according to certain embodiments of the invention. The system 100 comprises a plurality of automatic recognition subsystems including a first automatic recognition subsystem 102, a second automatic recognition subsystem 104 and an Nth automatic recognition subsystem 106. Although only three automatic recognition subsystems 102, 104, 106 are shown for the purpose of illustration, in practice more than three can be utilized.

By way of example, the three automatic recognition subsystems 102, 104, 106 can comprise pattern recognition systems such as statistical pattern recognition systems or Artificial Neural Network (ANN) based pattern recognitions systems. The automatic recognition subsystems 102, 104, 106 can comprise biometric or non biometric systems. The present invention can be used with extant automatic recognition systems or automatic recognition systems that are developed in the future. Internal details of extant automatic recognition systems are well known to those of ordinary skill in the art and are therefore not provided herein.

In general automatic recognition systems such as statistical pattern recognition systems or ANN based recognition systems take measurements of aspects of a person or object to be recognized and output an estimate of a probability that the person or object corresponds to a particular identity or estimates of probabilities that the person or object corresponds to each of multiple identities. For example, the measurements can take the form of an image of a fingerprint, retina, iris or face. The output is often normalized to the range zero to one. Such output normalization is generally possible, and methods of normalization will be apparent to persons having ordinary skill in the art.

In some applications a user asserts a particular identity (e.g., his or her actual identity) by presenting an electronic identification device, or entering a log-on ID or name, and is then scanned by a biometric sensor. In such applications only the probability that the person has the asserted identity is typically of interest.

In the system 100 probability estimates produced by the first, second and Nth automatic recognition subsystems 102, 104, 106 are coupled to a probability estimate combiner 108 through a first data coupling 110, a second data coupling 112 and an Nth data coupling 114 respectively. The probability estimate combiner 108 outputs a combined probability estimate that is based on the estimates output by the first, second and Nth automatic recognition subsystems 102, 104, 106. The output of the probability estimate combiner 108 is coupled through a result data coupling 109 to a combined probability estimate decayer 111. The decayer 111 accepts the combined estimate output by the probability estimate combiner 108, and produces a time dependent decayed combined probability estimate. In particular as time passes the output of the combined probability estimate decayer 111 reduces the estimate or estimates of the probability that the person or object matches one or more particular identities (e.g., one particular asserted identity.) Alternatively, each automatic recognition subsystem 102, 104, 106 is coupled to a dedicated probability decayer, and outputs of the dedicated probability decayers are coupled into the probability estimate combiner 108. Equation 15, which is described more fully below, expresses the equivalence of the foregoing alternative to the arrangement shown in FIG. 1. According to yet another alternative embodiment each security system or application is served by a different decayer.

The combined probability estimate decayer 111 is coupled by a first output data coupling 116, a second output data coupling 120 and an Nth output data coupling 124 to a first security subsystem or application 118, a second security subsystem or applications 122 and an Nth security subsystem or application 126 respectively. The result data coupling 109, the first, second and Nth data couplings 110, 112, 114 and the first, second and Nth output data couplings 116, 120, 124 can, for example, take the form of wired, optical and/or wireless communication channels. Moreover, the result data coupling 109, the data couplings 110, 112, 114 and the output data couplings 116, 120, 124 can be short range links, or network circuits that carry signals over larger distances. By way of nonlimiting example, the security application or subsystems 118, 122, 126 can be systems that provide security to computer resources, financial transactions, personal information, or physical security at a facility. Each of the security subsystems or applications 118, 122, 126 can have different security requirements, and therefore may test the decayed combined probability estimate output by the decayer 111 against a different threshold. Moreover, because the combined probability estimate is decayed as time passes by the decayer 111, the decayed combined probability estimate will pass below the different thresholds used by the security subsystems or applications 118, 122, 126 at different times, so that a particular person's or object's authentication can remain valid for different durations depending on the level of security required by each security subsystem or application 118, 122, 126.

According to alternative embodiments of the invention, one or more of the security subsystems or applications 118, 122, 126 is replaced by another type of system that relies on identification of persons or objects. For example, a variety of systems in a car, such as an audio system, electrically adjustable seats, a climate control system, and an electronically tunable suspension can be adjusted to suit a particular driver's preferences based on the decayed combined probability estimate that a driver has a particular identity. As another example, a desktop of a computer interface can be adjusted to a particular user's preferred state based on the decayed combined probability estimate.

The probability estimate combiner 108 implements a function that has properties that make it particularly suitable for combining probability estimates to obtain an overall probability estimate. The function implemented by the result function evaluator 108 in accordance with embodiments of the present invention is termed herein a combiner function. The combiner function accepts two or more probability estimates as input and outputs a combined probability estimate.

The aforementioned properties are described below with reference to one particular combiner function which can be represented by a closed form mathematical expression, however it should be understand that other combiner functions which share some or all of the desirable properties, to be described, can alternatively be used in certain embodiments of the invention.

A particular suitable probability estimate combiner function is given by:

$$C(x, y) = \frac{2xy}{1 + (2x - 1)(2y - 1)} \quad \text{EQU. 1}$$

where, x is a first independent variable (input for a first probability estimate); and y is a second independent variable (input for a second probability estimate);

FIG. 2 is a surface plot 200 of the above function for combining two estimates of the probability that a particular object or person has a particular identity. (Hereinbelow the term subject is used as a generic term referring to a person or object being automatically recognized.) In FIG. 2, the horizontal axes are the x-axis and the y-axis and the vertical z-axis gives the function value. The domain covers an x-axis interval from zero to one and a y-axis interval from zero to one as well.

A first desirable property of a combiner function that the particular combiner function shown in equation 1 and FIG. 2 has is that the range of the function is also from zero to one. If one of the security applications or subsystems 118, 122, 126 that relies on automatic recognition is, as is typical, designed to work with recognition probability estimates that range from zero to one, then providing two automatic recognition subsystems (e.g., 102, 104, 106) and the probability estimate combiner 108 will not necessitate modification of the security application or subsystem 118 because the probability estimate combiner 108 keeps probability estimates in the range zero to one. As will described hereinbelow, the decayer 111 also maintains probability estimates in the range zero to one. If necessary the inputs or output of the combiner function can be scaled.

Typically a value of the 1.0 of the input or output of the combiner function shown in FIG. 1 represents the highest probability that a subject being identified matches a particular identity, a value of zero of the input or output of the function represents the highest probability that the subject does not match the particular identity and a value of 0.5 of the input or output represents a neutral point at which there is equal probability that the subject does and does not match the particular identity.

In practice when using the function given by equation 1 in the probability estimate combiner 108, inputs should be restricted to the open domain (0,1) as opposed to the closed domain [0,1] in order to avoid divide by zero errors, which could occur in some floating point systems if one input is equal to one and the other is equal to zero.

More generally, even if a different domain is used, according to a generalization of the first property, the range is equal to the domain.

A second desirable property of a combiner function that the particular combiner function shown in equation 1 and FIG. 2 has is that it is commutative. The commutative property is expressed by equation 2.

$$C(x,y)=C(y,x) \quad \text{EQU. 2}$$

The commutative property is apparent from the symmetry of the appearance of the variables in equation 1.

A third desirable property of a combiner function that the particular combiner function shown in equation 1 and FIG. 2 has is that it is associative, that is $$C(C(u,v),w)=C(u,C(v,w)) \quad \text{EQU. 3}$$

To shown that the function is associative one can first plug in two arbitrary values u and v for x and y in equation 1 yielding a full expression for the inner application of the function in the left hand side of the equation 3. This yields:

$$C(u, v) = \frac{2uv}{1 + (2u - 1)(2v - 1)} \quad \text{EQU. 4}$$

One can then plug this result and another arbitrary variable w into the function again yielding:

$$C(C(u, v), w) = \frac{uvw}{\frac{(1 + (2u - 1)(2v - 1))}{\left(1 + \left(4\frac{uv}{1 + (2u - 1)(2v - 1)} - 1\right)(2w - 1)\right)}} \quad \text{EQU. 5}$$

which reduces to:

$$C(C(u, v), w) = \frac{uvw}{1 - u - v - w + uv + uw + vw} \quad \text{EQU. 6}$$

From the symmetry of the appearance of the variables u,v,w in the expression on the right hand side of equation 6 and from the commutative property of the combiner function it follows that the combiner function is associative.

Having the associative and commutative properties allows the probability estimate combiner 108 to apply the combiner function (e.g., the function given by equation 1) iteratively to more than two recognition probability estimates, taken in any order, without the concern that the result obtained on one system will differ from the result obtained on another system if the probability estimates are taken in a different order.

Moreover, because of the first property any number of recognition probability estimates (e.g., from facial recognition, retinal recognition, iris recognition, etc.) can be used while keeping the output in the range zero to one. The fact that the range is maintained between zero and one regardless of the number of probability estimates inputs, facilitates standard interfacing to the output of the probability estimate combiner 108 and decayer 111 even though some facilities or individual systems may have more automatic recognition subsystems than others. For example in an industrial facility, access to some areas may be restricted on the basis of fingerprint recognition alone, whereas access to more important areas may be restricted on the basis of fingerprint and iris scans.

A fourth desirable property of a combiner function that the particular combiner function given in equation 1 has is that probability estimates that agree as to whether a test subject matches a tested identity reinforce each other. In a particular case of this property when the two inputs to the combiner function are equal, the output of the combiner function will be stronger (further from the neutral point, i.e., 0.5 in the case of the combiner function given by equation 1) than the inputs. The latter specific case of the fourth property is stated mathematically as:

$$|C(x,x)-0.5|>|x-0.5| \text{ for all } x < >0.5 \text{ in the open domain } (0,1) \quad \text{EQU. 7}$$

The particular combiner function given by equation 1 can be shown to have this property by making the substitution y=x in equation 1 which yields:

$$C(x, x) = \frac{x^2}{1 + 2x^2 - 2x} \quad \text{EQU. 8}$$

FIG. 3 is 2-D section through the surface plot shown in FIG. 2 showing a plane in which the two independent variables (two estimates) are equal, i.e., y=x, across the interval of interest (0,1). A first curve 302, given by equation 8, is the particular combiner function given by equation 1 in the plane y=x. A straight line 304 which has unity slope is shown for reference. The contour of the particular combiner function through the plane y=x is also indicated at 202 in FIG. 2. As shown in FIG. 3 for any value x in the open domain (0,1) not equal to 0.5, the output of the combiner function has a value that is further from 0.5 than the input value of x. The practical import of this is that if multiple assessments as to whether a subject matches an identity are in general agreement, the combined output of the probability estimate combiner 108 will be further strengthened. For example, if one automatic recognition subsystem (e.g., a retinal scan) gives a probability of 0.8 that a subject matches a particular identity, and a second automatic recognition subsystem (e.g., a face recognition system) gives a probability of 0.75 that a subject matches a particular identity, the output of the probability estimate combiner 108, if based on equation 1, would be 0.923. Thus, the functioning of the probability estimate combiner 108 is qualitatively different than a similar subsystem based on averaging. In a system based on averaging, two probability estimates that generally agree would not combine to produce a combined estimate that is stronger than either—the combined estimate will be no higher than the higher estimate.

A generalization of the fourth property, that also applies to the particular combiner function given by equation 1 is that the quantity $C(X, X)$ is further from a first predetermined value $X_0$ than X, for all values of X not equal to $X_0$ and not equal to bounds of a predetermined domain, where the predetermined value $X_0$ is an interior point in the predetermined domain that corresponds to equal probability that the subject does and does not have the particular identity.

A fifth desirable property of a combiner function that the combiner function given in equation 1 has is that if one input probability has a neutral value (e.g., 0.5 in the case of the particular combiner function given by equation 1), the combiner function will simply reflect the other output. To show this fifth property for equation 1 one makes the substitution x=0.5 as in equation 9 below. (Intermediate algebraic steps are not shown.)

$$C(0.5, y) \rightarrow \frac{2(0.5)y}{1 + (2(0.5) - 1)(2y - 1)} = y \quad \text{EQU. 9}$$

The linear profiles of the combiner function through the planes x=0.5 and y=0.5 are indicated by lines 204 and 206 respectively in FIG. 2. According to the fifth property, inputs that essentially do not contain any information do not affect the output of the probability estimate combiner 108. Note that if simple averaging were used neutral inputs (e.g., equal to 0.5) would pull the output closer to 0.5.

A sixth desirable property of a combiner function for combining probability estimates that the particular combiner function given in equation 1 has is that contradictory indications as to whether a test subject matches a predetermined identity tend to cancel each other. That is, if one input probability estimate indicates that a test subject does not match a particular identity (e.g., gives a probability estimate input<0.5 in the case of the combiner function shown in equation 1) and a second input probability estimate indicates that the test subject does, in fact, match the particular identity (e.g., give a probability estimate input>0.5 in the case of the combiner function shown in equation 1) the output of the combiner function implemented in the probability estimate combiner 108 will be closer to neutral than either of the two inputs. In the case of the combiner function given in equation 1, if the input probability estimates differ from 0.5 by equal magnitude, opposite sign amounts, the output of the combiner function will be neutral, i.e., equal to 0.5. This is shown in equation 10, without intermediate algebraic simplification steps.

$$C(0.5-m, 0.5+m) = \frac{2(0.5-m)(0.5+m)}{1+(2(0.5-m)-1)(2(0.5+m)-1)} \quad \text{EQU. 10}$$
$$= 0.5$$

The constraints x=0.5−m, y=0.5+m parametrically restrict the combiner function to a plane in which y=1−x. The profile of the combiner function in the latter plane is indicated by line 208 in FIG. 2 which is at a constant level of Z=0.5 as expected.

According to certain embodiments of the invention the overall function (denoted D below) executed by the decayer 111 has at least four properties that will now be described. The first property of the decayer 111, for certain embodiments, is expressed by equation 11.

$$D(n,0)=n \quad \text{EQU. 11}$$

where, D is the overall function executed by the decayer, the first argument to D is a probability estimate, the second argument is a time parameter.

The first property is that at t=0 D returns the probability estimate unchanged.

The second property of the decayer 111, for certain embodiments, is given by equation 12.

$$t'>t \Rightarrow |D(n,t)-0.5| \geq |D(n,t')-0.5| \quad \text{EQU. 12}$$

In words, the second property of the decayer 111 is that as time progresses, the output of the decayer 111 asymptotically approaches the neutral value e.g., 0.5.

The third property of the decayer 111, for certain embodiments, is given by equation 13.

$$|n-0.5|>|m-0.5| \Rightarrow |D(n,t)-0.5| \geq |D(m,t)-0.5| \quad \text{EQU. 13}$$

In words, the third property of the decayer 111 is that a probability estimate that is initially surer (whether it indicates a match or not) will stay surer as it is decayed over time.

The fourth property of the decayer 112, for certain embodiments, is given by equation 14.

$$0<n<1 \hat{} t \geq 0 \Rightarrow 0<D(n,t)<1 \quad \text{EQU. 14}$$

In words the fourth property is that the output of the decayer 111 will stay in the domain of the input of the decayer 111 as time progresses. Although, equation 14 uses the domain 0 to 1 which is customary for probability estimates, more generally, if a non-standard range of probability estimates is used, a generalization of the fourth property applies.

Certain embodiments of the invention implement a combiner function and an overall function of the decayer 111 which together obey another property stated by equation 15.

$$D(C(n,m),t)=C(D(n,t),D(m,t)) \quad \text{EQU. 15}$$

Equation 15 states that the overall function of the decayer 111 is distributive over the combiner function implemented by the probability estimate combiner 108.

According to certain embodiments of the invention the combined probability estimate decayer 111 implements a function that is derived from the combiner function implemented by the probability estimate combiner 108. One example of such a function is derived from the combiner function given by equation 1. Using the combiner function given by equation 1 to combine a single input value with itself as shown in equation 8, is analogous to doubling a value with the addition function by adding the value to itself. Continuing this analogy, applying the inverse of equation 8 is analogous to halving a value by using the inverse of the function 2X which is ½X. The inverse of equation 8 is given by equation 16.

$$X = \frac{Z - \sqrt{Z - Z^2}}{2Z - 1} \quad \text{EQU. 16}$$

The nonlinear function given by equation 16 will be referred to as the "halving function". Note that the halving function does not involve time. The "halving function" is used by the decayer 111 in conjunction with another function that does involve time. A second function used by the decayer 111 (herein after referred to as the "decay function") suitably has a property that it is monotonically decreasing at least over a limited domain. In other words, as time elapses, the value of the output of the decay function decreases. Examples of possible decay functions are given in equations 17 to 20 below.

$$f(t)=2^{-t/3} \quad \text{EQU. 17}$$

$$f(t)=(0.95)^t \quad \text{EQU. 18}$$

$$f(t) = \frac{1}{t+1} \quad \text{EQU. 19}$$

$$f(t) = \begin{cases} \frac{24-t}{24}, & t<24 \\ 0, & t \geq 24 \end{cases} \quad \text{EQU. 20}$$

When a decay function, such as an exponential function, (e.g., equation 17 or 18), that obeys the property $F(t_1+t_2)=F(t_1)*F(t_2)$ is used the overall decay function executed by the decayer 111 has the property stated by equation 21.

$$t_1+t_2=t \Rightarrow D(D(n,t_1),t_2)=D(n,t) \quad \text{EQU. 21}$$

The property expressed by equation 21 allows the decay process to be performed iteratively on an irregular schedule, e.g., on demand (as needed), without effecting the resulting decayed values.

The output of equations 17-20 is suitably represented as a binary expansion. In standard binary arithmetic digits following the decimal point represent the sequence of fractions ½, ¼, ⅛, ⅟₁₆. . . . However in the decayer 111, the "halving function" will be used to assign the value of each digit. The value of the digits is based on the initial value of the combined estimate that is output by the probability estimate combiner 108. In particular the value of the first binary digit is determined by applying the halving function (e.g., equation 16, in the case of the combiner function given by equation 1) to the output of the probability estimate combiner 108. The values of successive digits (i.e., each Nth digit) are determined by applying the halving function to the preceding digit (i.e., $(N-1)^{th}$ digit). Thus, the values of the successive digits are related by the halving function. The computation of successive digits is represented by the series.

Value Bit 1 = Half(C_O)
Value Bit 2 = Half(Half(C_O))
Value Bit 3 = Half(Half(Half(C_O)))
. . .

In the preceding series C_O stands for the combiner function output and Half stands for the halving function (e.g., equation 16). This pattern is analogous to conventional binary representations of numbers floating point numbers which are less than one in which the first digit following the decimal point represents one-half, the second digit one-quarter (one-half of one-half), the third digit represents one-eighth (one-half of one-quarter, the fourth digit represents one-sixteenth (one-half of one-eighth) and so on. The sequence of values can be evaluated iteratively so as to reduce computational cost.

To illustrate the use of the halving function and the decay function, suppose equation 17 is used as the decay function. Further, suppose t is expressed in hours. After 1 hour has passed since a subject has been authenticated, the value equation 17 is $2^{\wedge}(-1\ hour/3\ hours)$ which is 0.7937005260 . . . in the decimal number system and 0.1100101100 . . . in the binary number system. Further, assume that the initial value of output of the probability estimate combiner 108 is 0.9. To compute the value associated with each binary digit, the halving function is applied iteratively starting with 0.9 yielding the series 0.7500000000, 0.6339745960, 0.5682348690, 0.5342777820, 0.5171590755, 0.5085820650, 0.5042913450, 0.5021457025, 0.5010728420, 0.5005364255 . . . . In order to compute the output of the decayer 111 at t=1 hour, first the values from the preceding list which correspond by position to the non-zero digits in the binary representation of $2^{\wedge}(-\frac{1}{3})$ are selected. These are 0.7500000000, 0.6339745960, 0.5171590755, 0.5042913450 and 0.5021457025 which correspond to digit positions 1, 2, 5, 7 and 8 respectively. Then the selected values are combined by iterative application of the combiner function. In other words, first 0.7500000000 and 0.6339745960 are combined to obtain a first intermediate value (in the case of the combiner function given by equation 1 this first intermediate value is 0.8386095220). Then the first intermediate value is combined with the next selected value 0.5171590755 to obtain a second intermediate value. The process continues until all of the selected values have been used. The result in this example is 0.8509828230. The iterative process of combining the selected values in this example is summarized in Table I:

| Iterative Step | Input 1 | Input 2 | Output |
|---|---|---|---|
| 0 | .7500000000 | .6339745960 | .8386095220 |
| 1 | .8386095220 | .5171590755 | .8476880136 |
| 2 | .8476880136 | .5042913450 | .8498911392 |
| 3 | .8498911392 | .5021457025 | .8509828230 |

Thus, using the decay function given by equation 17, and the halving function given by equation 16 the initial combined estimate of 0.9 drops to 0.8509828230 after one hour. One skilled in the art can select the decay function to obtain faster or slower decays as desired for a particular system.

To summarize, the decay function and the halving function are used as follows. After a combined estimate of the probability that a subject matches a particular identity has been computed by the probability estimate combiner 108, values for each of several binary digits are computed by iteratively applying the halving function to the combined estimate. At each of a sequence of times t (e.g., periodically, or as needed) the decay function is evaluated to obtain a decay function value in binary. The values corresponding to the nonzero binary digits are then combined using the combiner function (e.g., equation 1) to obtain the decayed combined probability estimate for the current time.

Another way to describe combining the digit values, is that each digit value is multiplied by the corresponding digit (0 or 1 in the case of binary) and the results combined using the combination function.

In the case of the combiner function given by equation 1, the process of computing the decayed combined probability estimate described above has the desirable property that if the combined probability estimate is initially above 0.5 meaning that it is more likely than not that the subject matches the tested identity, then the decayed combined probability estimate will asymptotically approach 0.5 as time elapses. Concordantly, the combined probability estimate will never reach a value approaching 0.0 which would indicate that there is a strong likelihood that the subject does not match the tested identity. Thus, as time passes the certainty that a person accessing secure resource or facilities is in fact the same person that was authenticated decreases, but there is no increase in the certainty that the person using the resources is an identity thief. In the manner of decaying probability estimates described above, a strong or weak probability that a subject matches a prescribed identity will not be converted to a strong or weak probability that a subject does not match the prescribed identity, and vice versa. Rather the probability estimates will simply decay in strength toward the neutral value of 0.5 as time progresses. Thus, there is no increase in certainty, either way, when no new authentication measurements have been taken.

According to an alternative embodiment different decay functions are used for separate systems (e.g., 118, 122, 126).

Figure 4:
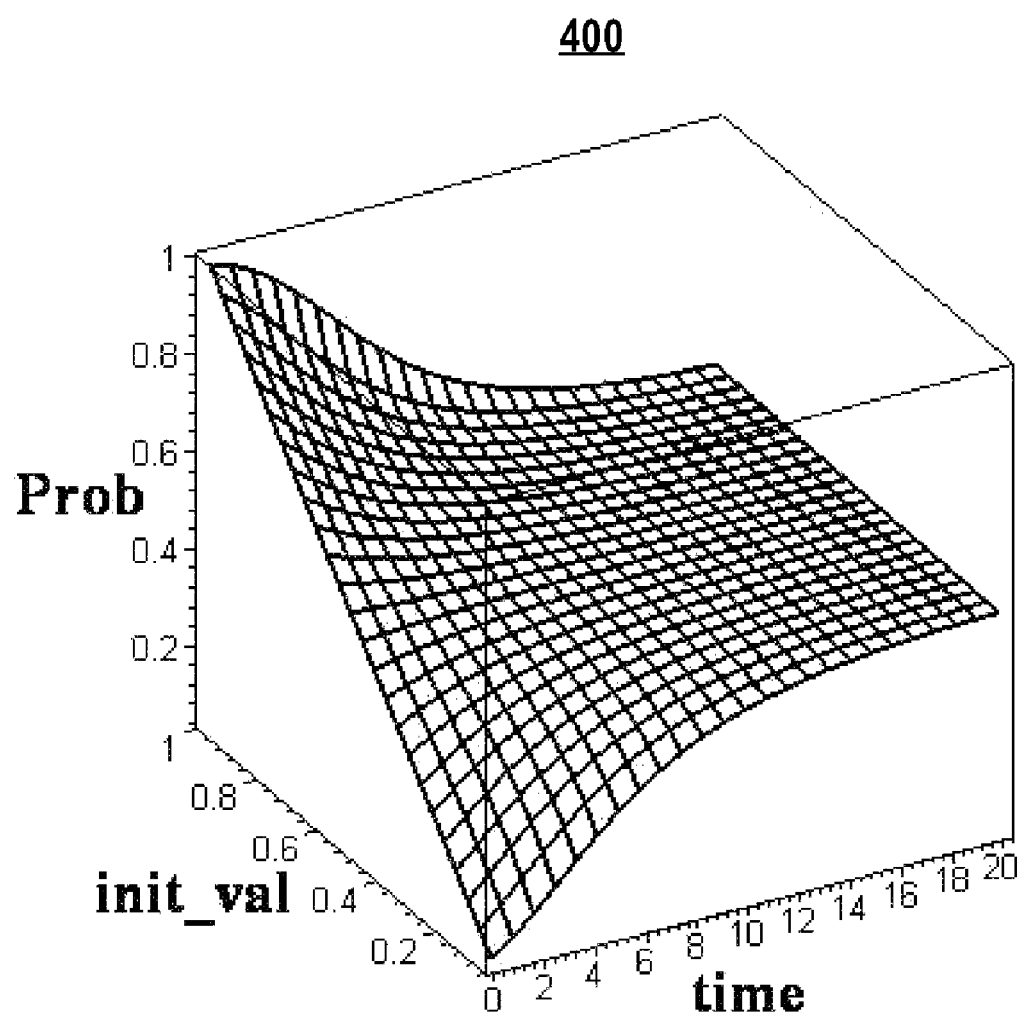
FIG. 4 is a surface plot of a function for decaying estimates of the probability that a particular object or person has a particular identity.

FIG. 4 is a surface plot 400 of a function for decaying estimates of the probability that a particular object or person has a particular identity. The plot 400 shows an overall decay function based on the halving function given in equation 16 and the decay function given in equation 17. In the plot 400, the independent variable axis at the left indicates the initial value of the combined probability estimate, the independent variable axis on the right indicates time, and the dependent variable axis gives the decayed combined probability estimate. As seen in the graph 400, as time progresses combined probability estimates asymptotically approach the neutral value of 0.5. Thus, there is no artificial increase in the certainty that the subject does not match the tested identity, if the initial combined probability estimate indicated that the subject did not match the tested identity.

Figure 5:
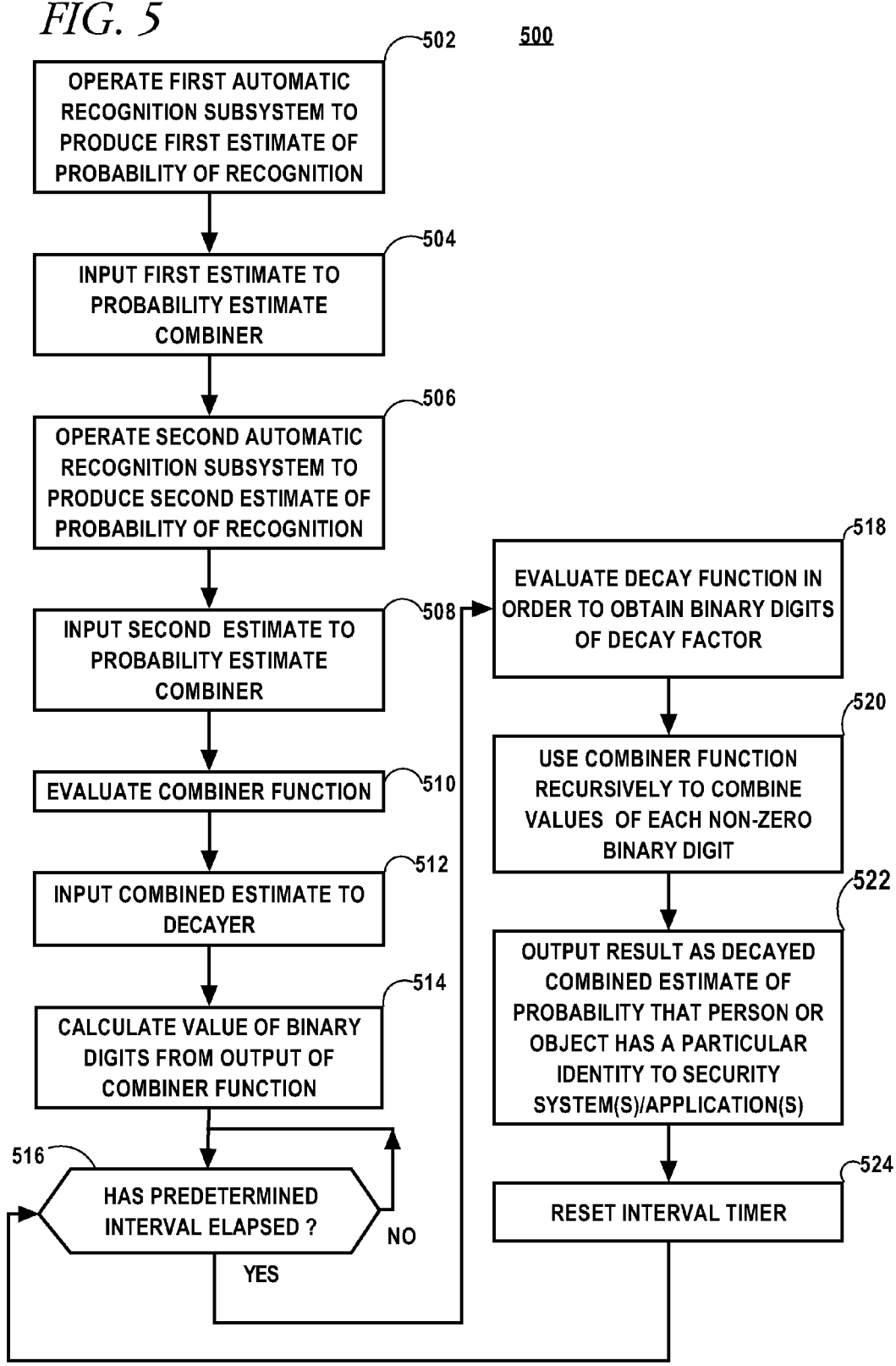
FIG. 5 is a flowchart of a method for performing automatic recognition, according to certain embodiments of the invention.

FIG. 5 is a flowchart 500 of a method for performing automatic recognition, according to certain embodiments of the invention. In block 502 a first automatic recognition system (e.g., 102) is operated to produce a first estimate of a probability of recognition of a subject. In block 504 the first estimate is input to the probability estimate combiner 108. In block 506 a second automatic recognition system is operated to produce a second estimate of the probability of recognition of the subject. In block 508 the second estimate is input to the probability estimate combiner 108. (If more than two automatic recognition systems are used these would be operated and the estimates they produce would be input to the combiner function evaluator 108) In block 510 the combiner function (e.g., that given by equation 1) is evaluated to produced a combined estimate of the probability of recognition of the subject. In block 512 the combined estimate is input into the combined probability estimate decayer 111. In block 514 the value of each binary digit is calculated from the combined estimate by iteratively applying the halving function. Block 516 tests if a predetermined interval (e.g., 5 seconds) has elapsed. (Although the method shown in FIG. 5 decays the combined estimate periodically, alternatively the combined estimate is decayed on demand). When the predetermined interval elapses, in block 518 the decay function (e.g., a function given by one of equations 17 to 20 or an alternative function) is evaluated in order to obtain the binary representation of the value of the decay function. In block 520 the combiner function (e.g., equation 1) is used to combine the values associated with each non-zero digit in the value of the decay function, thereby producing a decayed combined estimate of the probability that a subject matches a tested identity. In block 522 the result is output to the security applications or systems 118, 122, 126. Block 524 resets an interval timer function that clocks the predetermined interval, and thereafter the flowchart returns to block 516.

Figure 6:
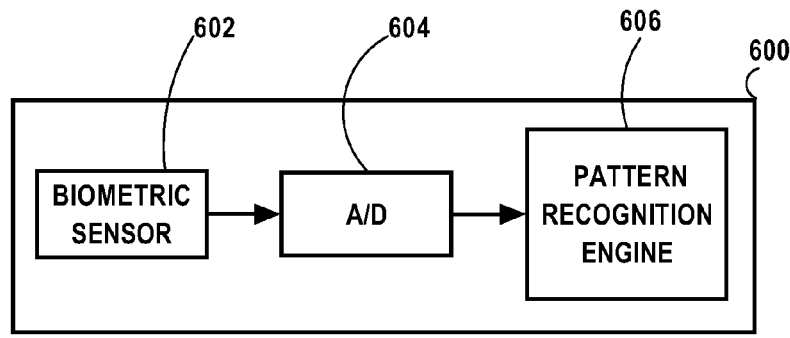
FIG. 6 is a functional block diagram of a biometric automatic recognition subsystem that is used in the system shown in FIG. 1 according to embodiments of the invention.

FIG. 6 is a functional block diagram of a biometric automatic recognition subsystem 600 that is used in the system shown in FIG. 1 according to embodiments of the invention. One or more of the recognition subsystems 102, 104, 106 shown in FIG. 1 can have the architecture shown in FIG. 6. The biometric automatic recognition subsystem 600 comprises a biometric sensor 602, that is coupled through an analog-to-digital converter (A/D) 604 to a pattern recognition engine 606. Biometric measurements are made using the biometric sensor 502. The measurements yield data. The biometric sensor 602 can, for example take the form of a fingerprint, iris, or retina camera. The automatic recognition engine 606 comprises a feature vector extraction front end and can, for example include an ANN or statistical pattern recognition based module for processing feature vectors to compute an estimate of the probability that a person matches a tested identity. Alternatively, automatic recognitions systems other than biometric type systems are used.

Figure 7:
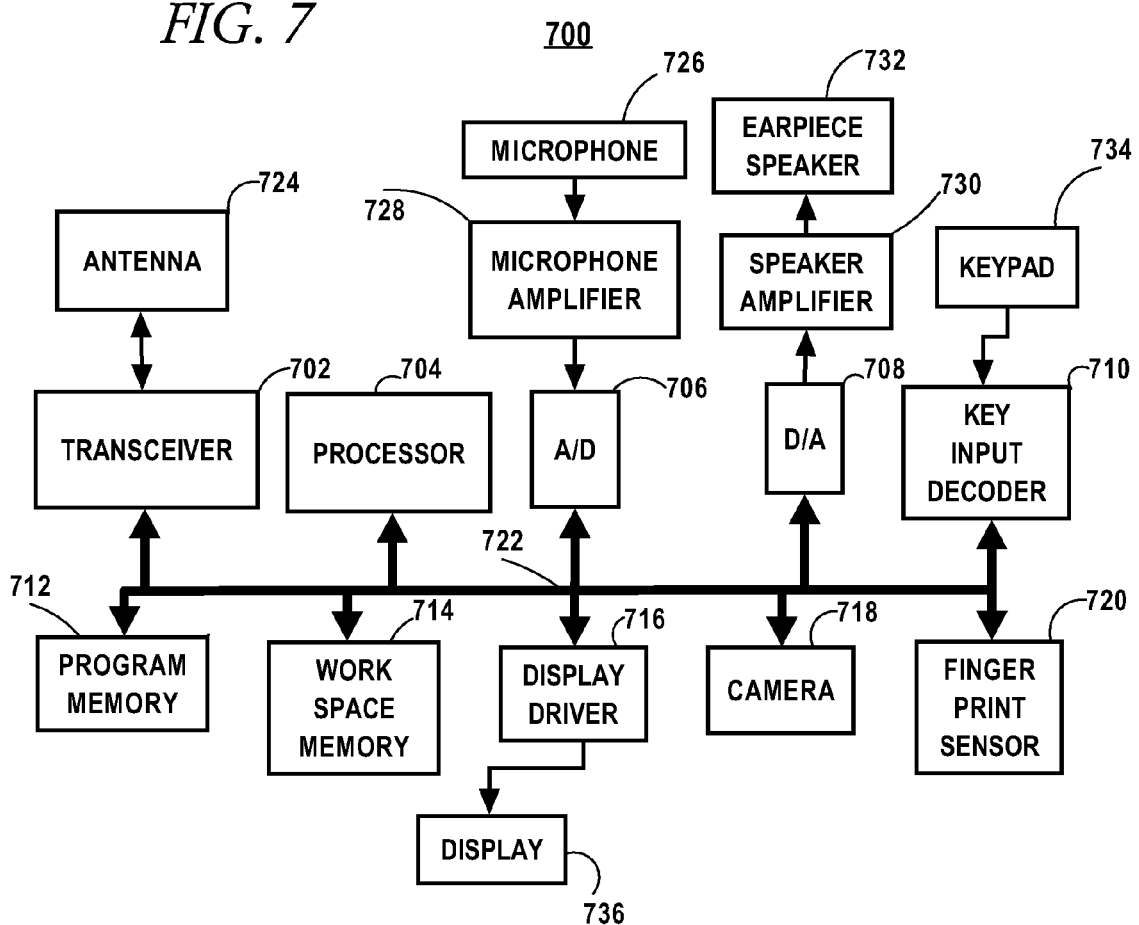
FIG. 7 is a hardware block diagram of a device that is capable of performing automatic recognition according to an embodiment of the invention.

FIG. 7 is a hardware block diagram of a wireless communication device 700 that is capable of performing automatic recognition according to an embodiment of the invention. As shown in FIG. 7, the device 700 comprises a transceiver 702, a processor 704, an analog-to-digital converter (A/D) 706, a digital-to-analog converter (D/A) 708, a key input decoder 710, a program memory 712, a workspace memory 714, a display driver 716, a camera 718, and a fingerprint sensor 720 coupled together through a signal bus 722.

The transceiver 702 is coupled to an antenna 724. Microwave or RF signals modulated with information pass between the transceiver 702 and the antenna 724. The transceiver 700 can be used to communicate combined probability estimates to other systems that rely on estimates generated by the device 700.

The processor 704 uses the workspace memory 714 to execute control programs for the device 700 that are stored in the program memory 712. The control programs include one or more programs that carry out the processes described above with reference to FIGS. 1-6. The program memory 712 is one form of computer readable medium on which such programs may be stored. Alternatively, such programs are stored on other types of computer readable media.

A microphone 726 is coupled through a microphone amplifier 728 to the A/D 706. Spoken utterances are digitized by the A/D 706 and made available to the processor 704 (or a specialized processor, not shown) for audio encoding and voice recognition. Programs for performing voice recognition are stored in the program memory 712 and executed by the processor 704. Voice recognition is used to determine a first estimate of a probability that a user of the device 700 has a predetermined identity (e.g., the identity of a single owner of the device 700.)

The D/A 708 is coupled through a speaker amplifier 730 to an earpiece speaker 732. Digitally encoded audio, e.g., spoken words, are converted to analog form by the D/A 708 and output through the speaker 732.

The key input decoder 710 is coupled to a keypad 734. The key input decoder 710 identifies depressed keys to the processor 704. The device 700 can generate a second estimate that the user of the device has the predetermined identity by comparing an average keystroke rate of the user, to a previously stored distribution (e.g., Gaussian mixture) of keystroke rate for the predetermined identity (e.g., the single owner).

The camera 718 is used to take a picture of the user's face, which is then processed by facial recognition software that is stored in the program memory 712 and executed by the processor 704. Facial recognition provides a third estimate of the probability that the user of the device 700 has the predetermined identity.

The fingerprint sensor 720 works in conjunction with fingerprint recognition software that is stored in the program memory 712 and executed by the processor 704. The fingerprint recognition software provides a fourth estimate of the probability that the user of the devices has the predetermined identity. The first through fourth estimates of the probability that the user of the device has the predetermined identity are used to compute a combined estimate as described in more detail above. The probability estimate combiner 108 and the combined probability estimate decayer 111 are suitably implemented as programs that are stored in the program memory 712 and executed by the processor 704. Alternatively, one or both of the probability estimate combiner 108 and the combined probability estimate decayer 111 can be implemented using application specific logic circuits.

The display driver 716 is coupled to a display 736. The display 736 can be used to output messages indicating that the user has successfully been identified by the device and to display indicia (e.g., numerical or graphical indicia) that reflects the current level of the combined estimate.

Figure 8:
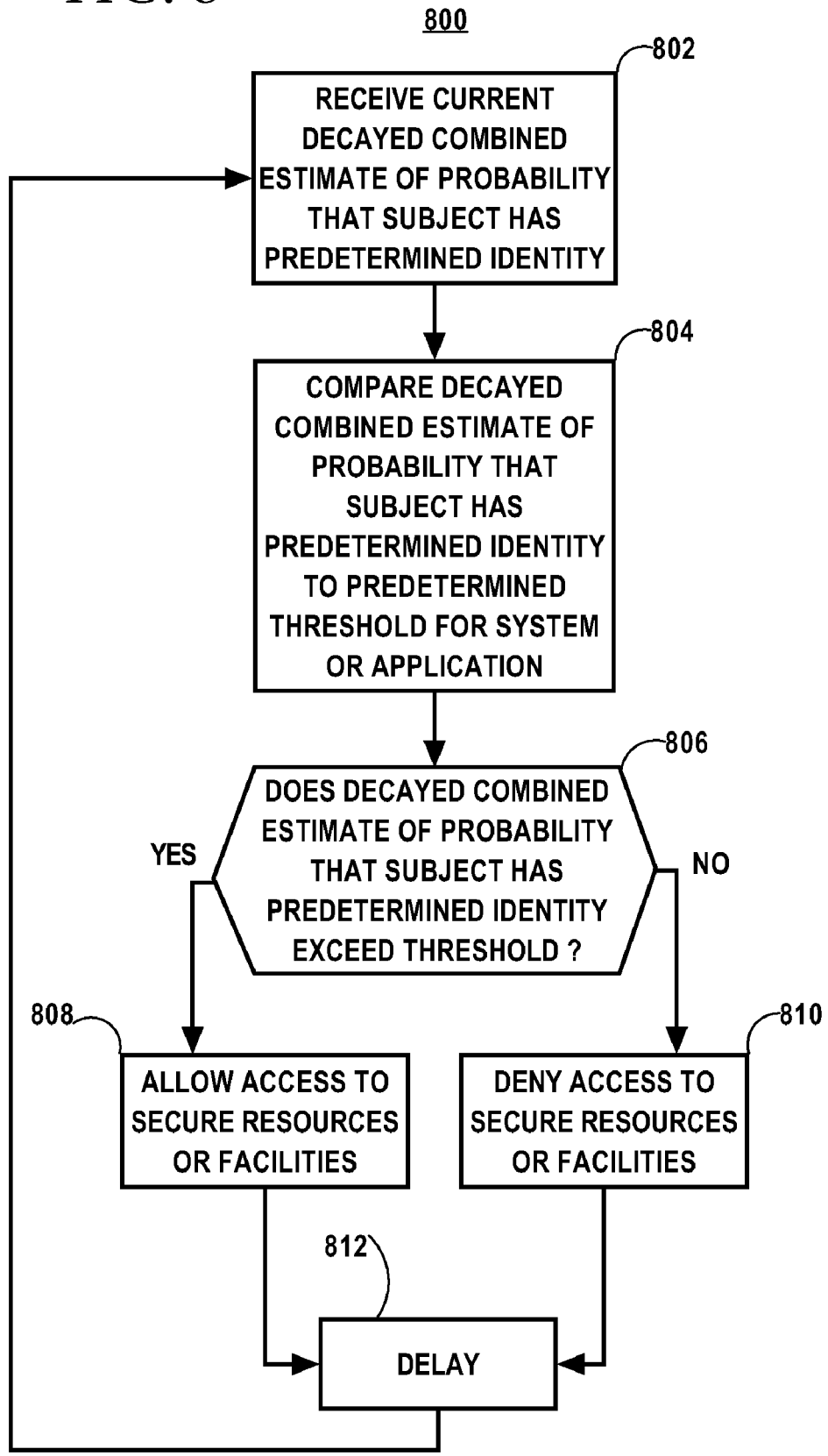
FIG. 8 is flowchart of a method of using a decaying combined estimate of the probability that a particular object or person has a particular identity.

FIG. 8 is flowchart 800 of a method of using a decaying combined estimate of the probability that a particular object or person has a particular identity. The method 800 is implemented by a security system or application (e.g., 118, 122, 126). In block 802 a current decayed combined estimate of the probability that a subject has a predetermined identity is received. In block 804 the received value is compared to a threshold for the system or application executing the method. Block 806 depends on whether the received value exceeds the threshold value. If so then in block 808 the system or application allows access to the secured resources or facilities. If the outcome of block 806 is negative then in block 810 the system or application denies access to the secured resources or facilities. After blocks 806 and 808 and after a delay 812 the flowchart 800 returns to block 802. Note that if the user is denied access, during the delay a user may use one or more of the automatic recognition subsystems 102, 104, 106 to authenticate themselves thereby triggering refreshing of the decayed combined probability estimate. Note that the decayed combined probability estimates can be 'pushed' down to the security systems or applications (e.g., 118, 122, 126) or requested by the security systems or applications as needed.

Figure 9:
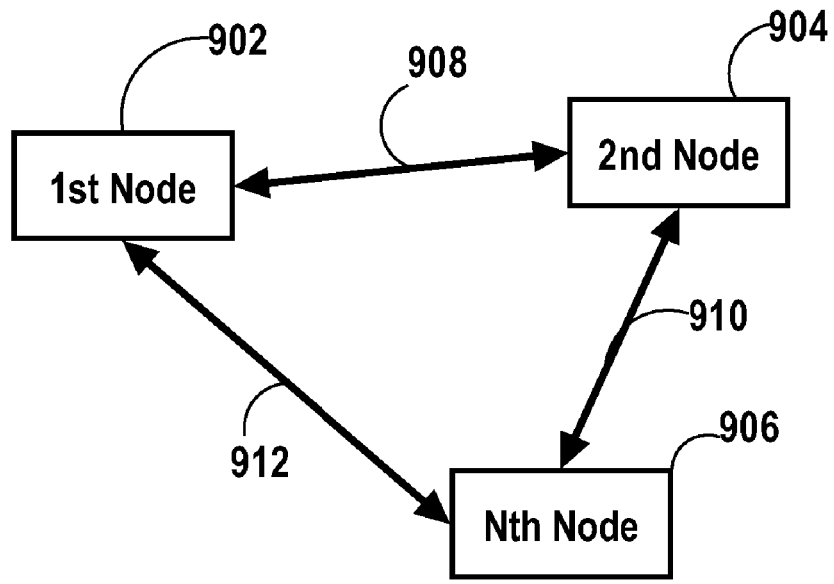
FIG. 9 is a block diagram of a distributed system 900 that uses decaying combined estimates according to an embodiment of the invention.

FIG. 9 is a block diagram of a distributed system 900 that uses decaying combined estimates according to an embodiment of the invention. The distributed system 900 includes a number of nodes 902, 904, 906 including a first node 902 a second node 904 and an Nth node 906. Although only three nodes are shown for purposes of illustration, more nodes can be included. The nodes 902, 904, 906 of the system 900 can include networked computer and/or mobile electronic devices, for example.

A first communication channel 908 couples the first node 902 to the second node 904, a second communication channel 910 couples the second communication node 904 to the Nth node 906 and an Nth communication channel 912 couples the first node 902 to the Nth node 906. The communication channels 908, 910, 912 can, for example, be wired, wireless and/or optical communication channels.

Automatic recognition subsystems (e.g., 102, 104, 106, 600) can be included in one of the nodes 902, 904, 906 or distributed among more than one of the nodes 902, 904, 906. According to certain embodiments one node (e.g., the first node 902) does all of the authentication, produces a combined estimate, periodically (or on demand) decays the combined estimate and sends the decayed combined estimate to the other nodes. According to certain embodiments one node handles the authentication and generation of the combined estimate, but each node receiving the combined estimate handles the task of decaying the combined estimate autonomously using its own internal clock or a remote time server (not shown). In a certain class of the latter type of embodiment, it is appropriate to use an exponential decay function if all of the nodes do not share a common clock and measurements of durations to be used in the decay function are based on non-synchronized local clocks. In such a class of embodiments the decaying combined estimates can be communicated from one node to another. This can be done on an as needed bases, e.g., as part of a process of handing off a user from one website or web service to another. In certain embodiments a $k^{th}$ node can receive a decayed combined estimate and combine the decayed combined estimate with another estimate that is generated by a single additional authentication system (e.g., located at the $k^{th}$ node) or combine the decayed combined estimate with a combined estimate that is produced using input from multiple additional authentication systems which may be located at the kth node and/or at another node. The foregoing are some examples of subsystems and/or functionality for combining estimates and decaying estimates being distributed throughout a system. Distributing the functions of combining estimates and decaying estimates provides for flexibility in meeting a wide range of security requirements using a unified framework.

Figure 10:
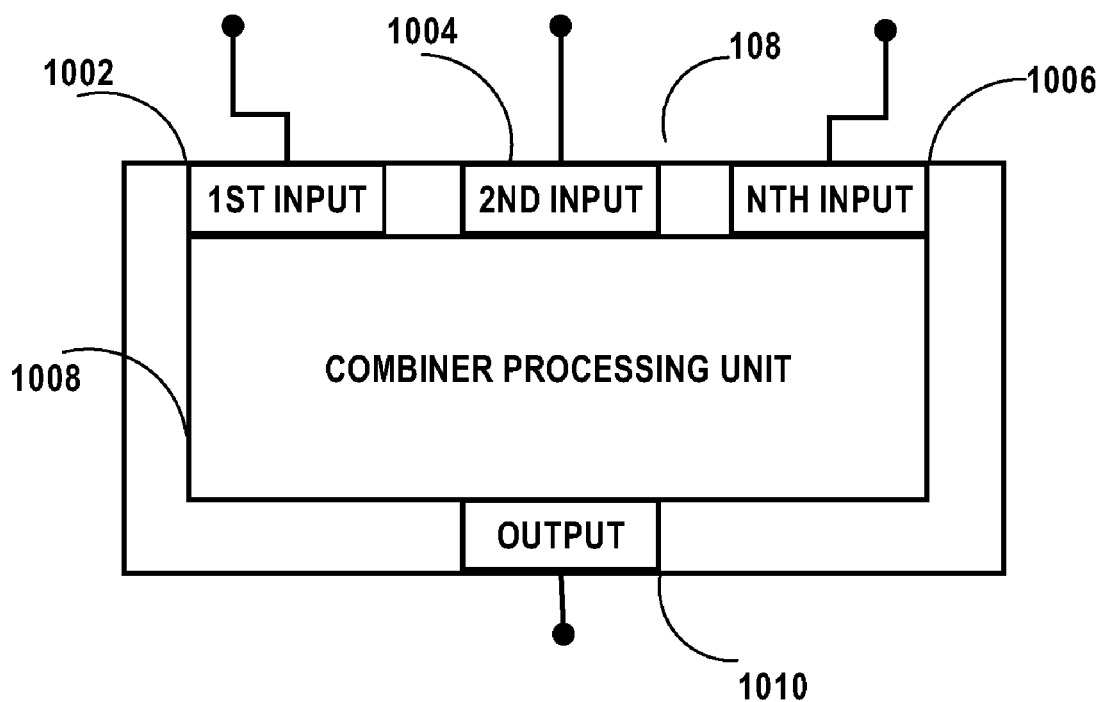
FIG. 10 is a block diagram of a probability estimate combiner according to certain embodiments of the invention.

FIG. 10 is a block diagram of the probability estimate combiner 108 according to certain embodiments of the invention. As shown in FIG. 10 the probability estimate combiner 108 comprises a first input 1002, a second input 1004, and an Nth input 1006 coupled to a combiner processing unit 1008. The combiner processing unit 1008 is coupled to an output 1010. The combiner processing unit 1008 suitably comprises, by way of example, a microprocessor coupled to a memory that stores programming instructions for executing the combiner function, an Application Specific Integrated Circuit (ASIC) adapted to execute the combiner function, or a Field Programmable Gate Array (FPGA) adapted to execute the combiner function. Separate probability estimates are received at the inputs 1002, 1004, 1006 and a combined probability estimate is output at the output 1010.

Figure 11:
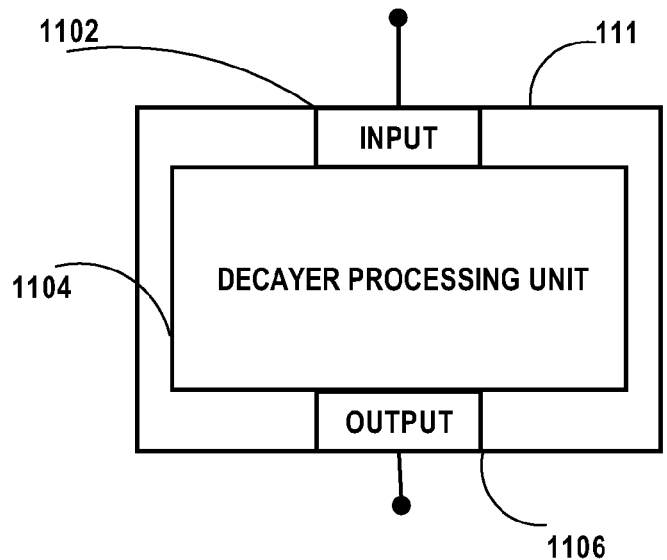
FIG. 11 is a block diagram of a combined probability estimate decayer according to certain embodiments of the invention.

FIG. 11 is a block diagram of the combined probability estimate decayer 111 according to certain embodiments of the invention. As shown in FIG. 11 the decayer 111 comprises an input 1102 coupled to a decayer processing unit 1104. The decayer processing unit 1104 is coupled to an output 1106. The decayer processing unit 1104 suitably comprises, by way of example, a microprocessor coupled to a memory that stores programming instructions for executing the overall decay function, an Application Specific Integrated Circuit (ASIC) adapted to execute the overall decay function, or a Field Programmable Gate Array (FPGA) adapted to execute the overall decay function. A probability estimate is received at the input 1102 and a decayed probability estimate is output at the output 1106.

Figure 12:
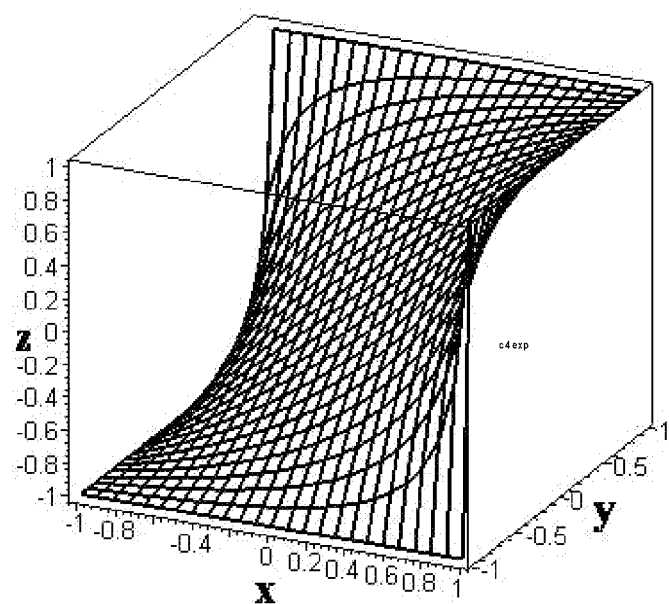
FIG. 12 is a surface plot of a second function for combining two estimates of the probability that a particular object or person has a particular identity.

FIG. 12 is a surface plot 1200 of a second function for combining two estimates of the probability that a particular object or person has a particular identity. The second function for combining two estimates is given by equation 22.

$$C(x, y) = \frac{x+y}{1+xy} \qquad \text{EQU. 22}$$

The halving function corresponding to equation 22 is given by equation 23.

$$X = \frac{1 - \sqrt{1-Z^2}}{Z} \qquad \text{EQU. 23}$$

FIG. 13 is a surface plot 1300 of a third function for combining two estimates of the probability that a particular object or person has a particular identity. The third function for combining two estimates is given by equation 24.

$$C(x, y) = -\frac{1 - \sqrt{1 + 4f(x, y)^2}}{2f(x, y)} \qquad \text{EQU. 24}$$

where, $$f(x, y) = \frac{(x+y)(1-xy)}{(1-x^2)(1-y^2)} \qquad \text{EQU. 25}$$

The corresponding halving function is given by:

$$X = \frac{Z^2 - 1 + \sqrt{Z^4 - Z^2 + 1}}{Z} \qquad \text{EQU. 26}$$

The domain and range of the second and third function for combining estimates is (−1,1) and in the case of the second and third function for combining estimates zero is the neutral value that represents equal probability that the subject does and does not match a tested identity. The second, and third functions for combining estimates, share the properties the first function for combining estimates that are described above. One skilled in the art will appreciate that other functions which have properties can be used.

Automatic recognition systems according to the invention can use biometric measurements for living subjects and other recognition (e.g., pattern recognition) techniques for nonliving subjects. Embodiments of invention that use a combiner function that have two or more of the six desired properties may provide benefits of the invention.

By way of example, in allowing access to resources or facilities the security system or application can operate an electrical lock to permit access through a doorway, permit a user to access secure files on a server, permit a user to carry out a financial transaction or allow access to secure data on a local storage medium. Alternatively, a person's identity is verified so that one more systems can be customized according the person's preferences.

Although the invention has been described above with reference to embodiments in which the probability estimates that are combined and decayed indicate the likelihood that a subject matches a particular identity, the invention is not limited to applications involving identification of subjects, rather probability estimate combiners and decayers described above can be used to combine and decay estimates (e.g., in the form in digital signals) in a variety of systems, including, but not limited to signal processing, fuzzy logic, and control systems.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A computer-readable medium storing programming instructions for decaying an estimate of a probability that a subject has a predetermined identity, the computer-readable medium including programming instructions for:
    calculating a series of digit values from the estimate of the probability by iteratively applying a halving function to the estimate of the probability;
    multiplying each digit value by a corresponding digit of an output of a time-dependent decay function to obtain a series of terms;
    iteratively combining the series of terms with a combiner function that accepts two inputs and produces an output, wherein an inverse of the combiner function when applied to combine a variable with itself is the halving function, whereby a decayed estimate of the probability that the subject has the predetermined identity is calculated; and
    selectively performing, based on the decayed estimate, a function selected from the group consisting of: granting access to a secure resource and granting access to a secure facility.

2. The computer-readable medium according to claim 1 wherein said decay function is an exponential function.

3. The computer-readable medium according to claim 1:
    wherein the combiner function is selected from the group consisting of:

$$C(x, y) = \frac{2xy}{1 + (2x-1)(2y-1)},$$

$$C(x, y) = \frac{x+y}{1+xy},$$

and $$C(x, y) = -\frac{1 - \sqrt{1 + 4f(x,y)^2}}{2f(x,y)},$$

in which:

$$f(x, y) = \frac{(x+y)(1-xy)}{(1-x^2)(1-y^2)}.$$

x is an input for a first probability estimate, and
y is an input for a second probability estimate; and
wherein the halving function is selected from the group consisting of:

$$X = \frac{Z - \sqrt{Z - Z^2}}{2Z - 1},$$

$$X = \frac{1 - \sqrt{1 - Z^2}}{Z},$$

and $$X = \frac{Z^2 - 1 + \sqrt{Z^4 - Z^2 + 1}}{Z}.$$

4. A computer-readable medium storing programming instructions for decaying an estimate of a probability that a subject has a predetermined identity, the computer-readable medium including programming instructions for:
    calculating a series of digit values from the estimate of the probability by iteratively applying a halving function to the estimate of the probability;
    multiplying each digit value by a corresponding digit of an output of a time-dependent decay function to obtain a series of terms;
    iteratively combining the series of terms with a combiner function that accepts two inputs and produces an output, whereby a decayed estimate of the probability that the subject has the predetermined identity is calculated; and
    selectively performing, based on the decayed estimate, a function selected from the group consisting of: granting access to a secure resource and granting access to a secure facility;
    wherein the combining function and the halving function are used on a predetermined domain that includes a predetermined interior point that represents an equal probability that the subject does and does not match the predetermined identity;
    wherein the predetermined interior point divides the predetermined domain into a first subdomain in which it is more likely that the subject does not have the predetermined identity and a second subdomain in which it is more likely that the subject does have the predetermined identity;
    wherein, for input values in the first subdomain, the halving function returns function values that are in the first domain and are closer to the predetermined interior point than the input values in the first subdomain; and
    wherein, for input values in the second subdomain, the halving function returns function values that are in the second domain and are closer to the predetermined interior point than the input values in the second subdomain.

5. The computer-readable medium according to claim 4 wherein said decay function is an exponential function.

6. The computer-readable medium according to claim 4:
wherein the combiner function is selected from the group consisting of:

$$C(x, y) = \frac{2xy}{1 + (2x-1)(2y-1)},$$

$$C(x, y) = \frac{x+y}{1+xy},$$

and $$C(x, y) = -\frac{1 - \sqrt{1 + 4f(x, y)^2}}{2f(x, y)}$$

in which:

$$f(x, y) = \frac{(x+y)(1-xy)}{(1-x^2)(1-y^2)}.$$

x is an input for a first probability estimate, and
y is an input for a second probability estimate; and
wherein the halving function is selected from the group consisting of:

$$X = \frac{Z - \sqrt{Z - Z^2}}{2Z - 1},$$

$$X = \frac{1 - \sqrt{1 - Z^2}}{Z},$$

and $$X = \frac{Z^2 - 1 + \sqrt{Z^4 - Z^2 + 1}}{Z}.$$

7. A system for decaying an estimate of a probability that a subject has a predetermined identity, the system comprising:
a decayer, comprising a processor unit, adapted to:
calculate a series of digit values from the estimate of the probability by iteratively applying a halving function to the estimate of the probability;
multiply each digit value by a corresponding digit of an output of a time-dependent decay function to obtain a series of terms; and
iteratively combine the series of terms with a combiner function that accepts two inputs and produces an output, wherein an inverse of the combiner function when applied to combine a variable with itself is the halving function, whereby a decayed estimate of the probability that the subject has the predetermined identity is calculated; and
a subsystem adapted to:
selectively perform, based on the decayed estimate, a function selected from the group consisting of: granting access to a secure resource and granting access to a secure facility.

8. The system according to claim 7 wherein said decay function is an exponential function.

9. The system according to claim 7:
wherein the combiner function is selected from the group consisting of:

$$C(x, y) = \frac{2xy}{1 + (2x-1)(2y-1)},$$

$$C(x, y) = \frac{x+y}{1+xy},$$

and $$C(x, y) = -\frac{1 - \sqrt{1 + 4f(x, y)^2}}{2f(x, y)}$$

in which:

$$f(x, y) = \frac{(x+y)(1-xy)}{(1-x^2)(1-y^2)}.$$

x is an input for a first probability estimates and
y is an input for a second probability estimate; and
wherein the halving function is selected from the group consisting of:

$$X = \frac{Z - \sqrt{Z - Z^2}}{2Z - 1},$$

$$X = \frac{1 - \sqrt{1 - Z^2}}{Z},$$

and $$X = \frac{Z^2 - 1 + \sqrt{Z^4 - Z^2 + 1}}{Z}.$$

10. A system for decaying an estimate of a probability that a subject has a predetermined identity, the system comprising:
a decayer, comprising a processor unit, adapted to:
calculate a series of digit values from the estimate of the probability by iteratively applying a halving function to the estimate of the probability;
multiply each digit value by a corresponding digit of an output of a time-dependent decay function to obtain a series of terms; and
iteratively combine the series of terms with a combiner function that accepts two inputs and produces an output, whereby a decayed estimate of the probability that the subject has the predetermined identity is calculated; and
a subsystem adapted to:
selectively perform, based on the decayed estimate, a function selected from the group consisting of: granting access to a secure resource and granting access to a secure facility;
wherein the combining function and the halving function are used on a predetermined domain that includes a predetermined interior point that represents an equal probability that the subject does and does not match the predetermined identity;
wherein the predetermined interior point divides the predetermined domain into a first subdomain in which it is more likely that the subject does not have the predetermined identity and a second subdomain in which it is more likely that the subject does have the predetermined identity;
wherein, for input values in the first subdomain, the halving function returns function values that are in the first domain and are closer to the predetermined interior point than the input values in the first subdomain; and wherein, for input values in the second subdomain, the halving function returns function values that are in the second domain and are closer to the predetermined interior point than the input values in the second subdomain.

11. The system according to claim 10 wherein said decay function is an exponential function.

12. The system according to claim 10:

wherein the combiner function is selected from the group consisting of:

$$C(x, y) = \frac{2xy}{1 + (2x-1)(2y-1)},$$

$$C(x, y) = \frac{x+y}{1+xy},$$

and $$C(x, y) = -\frac{1 - \sqrt{1 + 4f(x, y)^2}}{2f(x, y)}$$

in which:

$$f(x, y) = \frac{(x+y)(1-xy)}{(1-x^2)(1-y^2)}.$$

x is an input for a first probability estimate, and
y is an input for a second probability estimate; and
wherein the halving function is selected from the group consisting of:

$$X = \frac{Z - \sqrt{Z - Z^2}}{2Z - 1},$$

$$X = \frac{1 - \sqrt{1 - Z^2}}{Z},$$

and $$X = \frac{Z^2 - 1 + \sqrt{Z^4 - Z^2 + 1}}{Z}.$$

* * * * *

UNITED STATES PATENT AND TRADEMARK OFFICE
CERTIFICATE OF CORRECTION

| | | |
|---|---|---|
| PATENT NO. | : 7,664,962 B2 | |
| APPLICATION NO. | : 11/276732 | |
| DATED | : February 16, 2010 | |
| INVENTOR(S) | : Kuhlman | |

It is certified that error appears in the above-identified patent and that said Letters Patent is hereby corrected as shown below:

IN THE SPECIFICATION

In Column 6, Line 4, delete "estimate);" and insert -- estimate). --, therefor.

In Column 9, Line 57, in Equation "14", delete "$0<n<1\hat{\ }t$" and insert -- $0 < n < 1 \wedge t$ --, therefor.

IN THE CLAIMS

In Column 18, Line 14, in Claim 3, after Equation, delete "." and insert -- , --, therefor.

In Column 19, Line 20, in Claim 6, after Equation, delete "." and insert -- , --, therefor.

In Column 20, Line 14, in Claim 9, after Equation, delete "." and insert -- , --, therefor.

In Column 20, Line 17, in Claim 9, delete "estimates and" and insert -- estimate, and --, therefor.

In Column 22, Line 5, in Claim 12, after Equation, delete "." and insert -- , --, therefor.

Signed and Sealed this
Twelfth Day of June, 2012

David J. Kappos
*Director of the United States Patent and Trademark Office*